3,170,668
BLANKING VALVE HAVING THREADED BOLT
MEANS FOR INCREASING SEALING PRESSURE
Gerard D. Aulisa, Claymont, Del. (% Sun Oil Co.,
P.O. Box 426, Marcus Hook, Pa.)
Filed Nov. 13, 1962, Ser. No. 236,901
2 Claims. (Cl. 251—158)

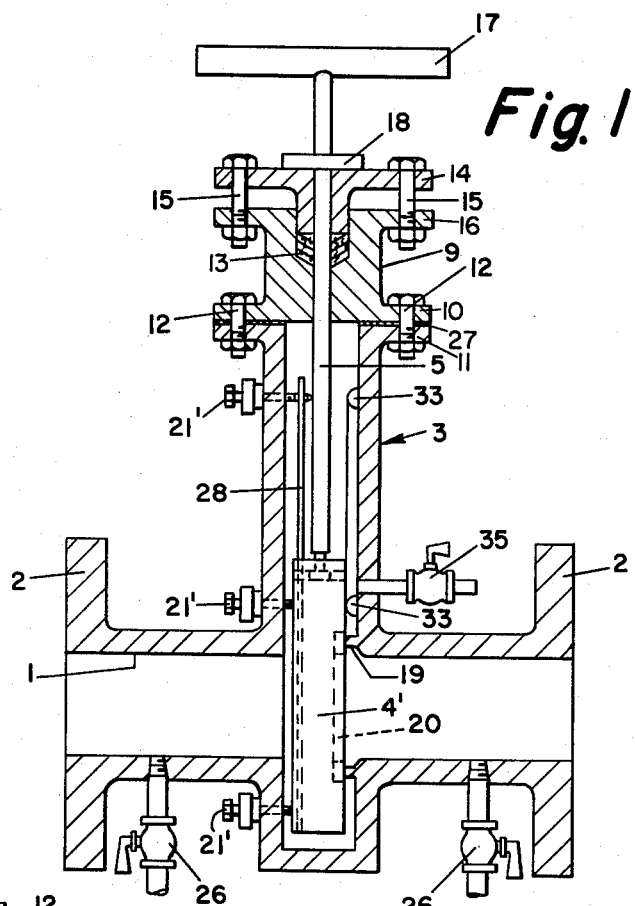
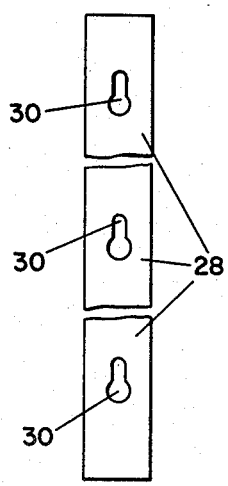
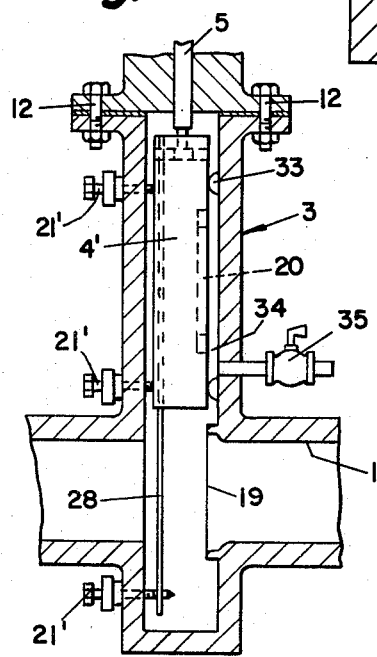
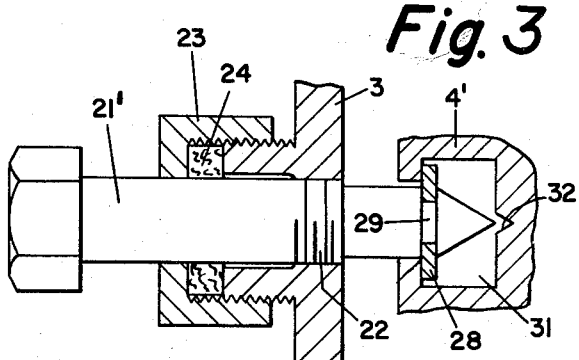

This invention relates to a valve, and more particularly to a valve of the so-called blanking or blinding type, for providing positive shut-off type in a pipe line.

In petroleum refineries, as well as in other process industries, periodic plant shutdowns are required, for maintenance purposes. Such shutdowns necessitate positive or complete shut-off in the various pipe lines involved in the plant or process, so that the plant equipment or apparatus may be repaired or worked on with complete safety, during the time of the shutdown. The gate valves ordinarily provided in the pipe lines (which valves are used for flow control purposes, during operation of the plant) cannot be relied upon to provide the necessary complete shut-off in the lines. With such valves, there is an ever-present possibility of leakage. Therefore, for complete safety, "blanking" or "blinding" of the various lines is invariably required.

According to prior petroleum refinery practice, this "blanking" or "blinding" was done in steps stated in instruction form as follows: first, shut down the plant by closing the appropriate valves; next, depressure the various lines and vessels; next, unflange each line to be "blanked" and wedge between the uncoupled a "blank" (which is an imperforate metal plate); and finally, re-flange the lines. This prior practice for "blanking" is quite expensive and time-consuming, and may even involve danger to personnel. In the first place, the work of unflanging, and separating the ends of the lines sufficiently for the insertion of a "blank" requires platforms from which to work if the lines are elevated off the ground (as most of them are). This means that carpenters must be called in, as part of a special skilled, hightly-paid-craft labor force, to build the scaffolds or platforms. This is expensive, and time-consuming. Next, pipefitters (again part of the special skilled, highly-paid-craft labor force) are needed, to perform the actual operations (unflanging, etc.) on the pipe; again, considerable expense is involved. Also, there is the possibility that there may be leakage past the valves (even though they are closed) while the depressuring is taking place, resulting in leakage back into the plant; if this occurs, the unflanging becomes fraught with danger, because of the inevitably resulting hydrocarbon spillage.

The "blanks" must of course be removed from the lines when the shutdown is over, and when it is desired to put the plant back into normal operation. Even though proper precautions are taken, occasionally one of the "blanks" is inadvertantly left in a line when the plant is started up after a shutdown. Even though this trouble is detected fairly early in the startup procedure, the line must be again depressurized before the "blank" can be removed, and this depressuring is a time-consuming (and therefore costly) procedure.

An object of this invention is to provide a novel blanking valve construction.

Another object is to provide a blanking valve which is arranged to be permanently connected into a pipe line to be blanked off.

A further object is to provide a blanking valve which can be operated while the pipe line is under pressure, that is, without first depressuring the line.

A still further object is to provide a blanking valve which can be rendered operative by the regular plant operating personnel, without the necessity of calling in skilled craftsmen.

An additional object is to provide a blanking valve which can be manually operated from open to closed position so simply and easily that the operation can be effected from a portable ladder.

The objects of this invention are accomplished, briefly, in the following manner: A section of pipe, which is adapted (as by means of flanges) to be permanently connected into a pipe line desired to be blanked off, carries a housing one end of the interior of which communicates with the interior of the pipe section. An imperforate metal valve or blanking plate is positioned in said housing, and is arranged for sliding movement, in a direction substantially transversed to the longitudinal axis of the pipe section, from a position within said housing to a position within the pipe section, in which latter position it can cut off the flow of fluid through the pipe section. The sliding movement of the plate can be brought about manually by means of a stem which is coupled to one end of the plate by means of a slotted coupling, and which is sealed through the wall of the housing. The plate carries a gasket, in a recess on one face thereof. When the plate is in position within the pipe section, this gasket is adapted to engage a portion of the pipe wall, to provide a seal between the plate and the wall. The ends of a plurality of take-up bolts, which are threadedly mounted through the wall of the housing, are adapted to engage one face of the plate, when the latter has moved into the pipe section. By turning these bolts, the plate is moved in a direction substantially parallel to the axis of the pipe, to effect a sealing engagement of the plate with the wall of the pipe. As a result, the valve is closed (and sealed) and the pipe line is "blanked off" or "blinded." The pipe section is provided with a pair of valves, one on either side of the plate, which can be used for cleaning or purging purposes.

A detailed description of the invention follows, taken in conjunction with the accompanying drawing, wherein:

FIG. 1 is a vertical section through one embodiment of the invention, the valve being illustrated in closed position;

FIG. 2 is a partial section similar to FIG. 1, the valve being illustrated in open position;

FIG. 3 is an enlarged sectional view of a detail; and

FIG. 4 is a front elevation of one of the elements of the FIG. 1 embodiment.

Referring now to the drawing, which shows one embodiment, the blanking valve assembly of the invention is formed as a special section of pipe 1 provided with flanges 2 at its opposite ends, by means of which the pipe section may be permanently connected into a pipe line desired to be blanked off. That is to say, the pipe 1 is of the same diameter as the pipe line which is desired to be blanked off and pipe 1 forms a continuation of such pipe line; the fluid flowing through the pipe line flows also through pipe 1. Approximately midway of the length of pipe 1, an upstanding integral housing 3 is joined to the pipe section. The width of housing 3 (that is, the dimension in a direction perpendicular to the paper in FIG. 1) is considerably greater than the diameter of pipe 1, as is also the vertical height of this housing; the major portion of the housing extends upwardly from the pipe in FIG. 1, although the housing also extends some distance downwardly from the pipe. The width of the housing and the vertical height thereof are both considerably greater than the depth or thickness of the housing, measured parallel to the longitudinal axis of the pipe 1. The housing 3 in effect divides the pipe 1 into two portions, lengthwise.

The interior of housing 3 opens into and communicates with the interior of pipe 1. An imperforate disc-like metal valve or blanking plate 4' is mounted in housing 3. This plate is of sufficient size to completely cover the opening in pipe 1 (see FIG. 1), and is mounted for vertical sliding movement within housing 3, in a manner to be described hereinafter. The interior of housing 3 has a size sufficient to accommodate therein the plate 4', when such plate is in the elevated or raised ("open") position illustrated in FIG. 2, i.e., when the plate is above the pipe 1. Obviously, the housing 3 also accommodates the plate 4' when this plate is in the depressed or lowered ("closed") position illustrated in FIG. 1.

In order to provide for manually operated sliding movement of plate 4', a stem 5 is coupled to the upper portion of this plate. A slotted coupling between the stem and the plate allows sidewise (horizontal) movement of the plate with respect to the stem, while positively coupling the stem and plate together for movement in a vertical direction. This slotted coupling may comprise a slot of inverted-T shape (in cross-section) which extends through the entire thickness of plate 4' (from one face to the other thereof) and, on stem 5, a lower head portion which fits in the cross-bar (lower) portion of the T-slot and a neck portion (of smaller diameter) which fits in the stem portion of the slot.

For ease in disassembly of the device for maintenance or repair, the upper portion of the housing is closed by a removable cover member 9 having a flange 10 at its lower end. A matching flange 11 is provided at the upper end of member 3, and bolts 12, which extend through both flanges 10 and 11, removably and sealingly couple together members 9 and 3, a gasket 27 preferably being inserted between the flanges 10 and 11 for sealing purposes.

The stem 5 extends upwardly from plate 4' to the outside of the housing, and is sealed through the cover member 9. For sealing of stem 5, packing 13 is disposed annularly around this stem, this packing being compressed to provide a seal around stem 5 by means of a gland 14 which is bolted at 15 to a flange 16 provided at the upper end of cover member 9.

A cross-bar 17 is rigidly secured to the upper end of stem 5, to serve as an operating handle for the stem 5 and the plate 4'. By grasping handle 17 and moving the same, the plate 4' may be slid in a vertical direction within the housing (by means of stem 5), from the FIG. 2 position (wherein the plate 4' is entirely above the pipe section 1) to the FIG. 1 position (wherein plate 4' is, in effect, located between the two portions of pipe 1). A disc 18 is rigidly secured to stem 5, below handle 17. When this disc comes into contact with the top surface of gland 14 (as illustrated in FIG. 1), it acts as a stop member, to prevent further downward movement of stem 5 and plate 4'. Disc 18 also serves as a visual indicator; when the disc is seen to be in contact with gland 14, it is known that the plate 4' is in its lower or "closed" position.

A raised face flange 19 is provided on one of the two portions of pipe 1 (illustrated as the right-hand portion in the drawing). A ring gasket 20 is mounted completely within an annular recess or groove provided in one face (illustrated as the right-hand face in the drawing) of plate 4'. Face flange 19 provides a sealing surface against which the gasket 20 can seal (see FIG. 1), and the gasket 20 has such diameter and width (compared to those of face flange 19) as to come into sealing engagement with the pipe face flange 19 when plate 4' moves to the "closed" position of FIG. 1, this occurring even though gasket 20 is mounted within a recess. Gasket 20 is made of any suitable material having sufficient flexibility to provide the desired seal against face flange 19. Flange 19 has a width (in the radial direction) just slightly smaller than that of gasket 20.

Two rectangular stationary plate or guide members 28 are mounted within housing 3, to serve as slides. The two members 28, only one of which is shown in FIGS. 1–3, each extend in a vertical direction, are parallel to each other, and are positioned at respective opposite sides of pipe section 1, outside of or radially beyond the confines of the outer wall of this pipe. A total of six take-up or jack bolts 21', which are located radially outwardly with respect to the outer wall of pipe 1, are threadedly mounted in respective tapped holes 22 provided in that wall of housing 3 which is remote from gasket 20. These bolts are arranged in two sets of three each, with the three bolts of each respective set in vertical alignment with each other. As shown in FIG. 1, each set of three vertically-aligned bolts 21' is evenly spaced in a vertical direction; that is to say, the vertical distance between the uppermost and central bolts of each triad is equal to the vertical distance between the central and lowermost bolts of each triad. Bolts 21' extend parallel to the longitudinal axis of pipe 1, and the inner (conical, pointed) ends of said bolts extend through the wall of housing 3 so that such inner ends are located in the interior of the housing. Each of the six bolts 21' (see FIG. 3) has a portion 29 of reduced diameter located slightly to the rear of its inner pointed or conical end, and each of the two plates 28 is provided with three vertically-spaced keyhole-shaped slots 30 (see FIG. 4) into which fit the corresponding reduced-diameter bolt portions 29. In this way, each of the two plates 28 is mounted on a respective triad of vertically-aligned bolts 21'. Thus, the two members 28 are mounted parallel to each other, each being retained in position by means of a respective triad of bolts 21'.

A pair of parallel, vertically-extending elongated grooves 31 is provided in the rear or left-hand face of valve plate 4', one for each respective plate or slide 28. See FIG. 3. Grooves 31 each extend the full height of plate 4'. The grooves 31 are of T-shape in cross-section, and each of the grooves accommodates therein, in its respective cross-bar portion, a respective one of the slides 28. The valve plate 4', as it moves up and down, is guided by the slides 28. In other words, plate 4' rides up and down on the slides 28. The pointed heads of the bolts 21' extend into the cross-bar portion of the corresponding groove 31, and the shanks of the bolts extend through the stem portion of the corresponding groove 31, toward the outside of housing 3.

Four conical depressions 32 (see FIG. 3) are provided in plate 4', two extending inwardly or to the right from the bottom of each of the two grooves 31. The vertical spacing between the two individual depressions of each pair is equal to the vertical spacing between adjacent bolts in the vertically-aligned bolt triads 21'.

When the valve plate 4' has been lowered to the "closed" portion illustrated in FIG. 1, tightening of the two lower bolts 21' on each side causes the pointed ends of these bolts to engage the corresponding depressions 32, thus forcing plate 4' to move to the right, substantially parallel to the longitudinal axis of pipe 1, to bring gasket 20 into sealing engagement with face flange 19, thereby to "blank off" line 1 by providing a seal between the two ends thereof. The pointed inner ends of these two lower bolts 21' on each side fit into the respective conical depressions 32 in plate 4' as the bolts are tightened, thus centering the plate 4' and aligning it properly, so that gasket 20 lines up with the raised face flange 19.

It is of course necessary that there be no leakage around bolts 21', which extend through the wall of the housing, just as does stem 5. A seal can be effected around these bolts by utilizing for each bolt a cap screw 23 (see FIG. 3) within which packing 24 is positioned. Cap screw 23 is internally threaded and mates with external threads provided on a boss or sleeve which extends outwardly from the wall of the housing; the cap at the outer end of the cap screw compresses packing 24 between such cap and the outer end of the sleeve previously mentioned. Thus, packing 24 is forced into sealing engagement with the smooth or unthreaded outer end of the corresponding bolt 21'. See FIG. 3.

It is intended that the blanking valve assembly of this invention be permanently installed in a line desired to be "blanked off," the installation being made by means of the flanges 2. The blanking valve of this invention may be thought of as a "pressure-blanker," since the valve can be operated (in order to close off or "blank off" the line in which the valve assembly is installed) while the line is under pressure, that is, without depressuring the line.

The operation of the blanking valve of this invention will now be described. The operator forces the blanking plate 4' vertically downwardly from the FIG. 2 position to the FIG. 1 position, by grasping handle 17 and applying downward force to the stem 5. The stop disc 18, by coming into contact with the upper face of gland 14, indicates when the plate 4' has reached the "closing" position of FIG. 1. Once the blanking plate 4' is in this latter position, the operator tightens the two lower take-up bolts 21' on each side approximately two turns. This forces the blanking plate 4' to the right in FIG. 1, in a direction substantially parallel to the longitudinal axis of pipe 1, bringing gasket 20 into sealing engagement with face flange 19 and completely "blanking off" the line, i.e., closing completely the blanking valve. As the four lower bolts 21' are tightened, the slotted coupling between stem 5 and plate 4' allows relative movement between the stem and plate, so that the stem remains perfectly straight when the blanking plate 4' is moved horizontally to the sealing position.

For unblanking, of course, the reverse of the above procedure is followed. The flexibility of the gasket 20 allows it to regain its thickness upon the loosening of the take-up bolts 21. Since this gasket is mounted in a recess, its life is lengthened.

Assuming that the valve plate 4' is in the closed or lower position illustrated in FIG. 1, when the two lower jack bolts 21' on each side of pipe 1 are screwed outwardly for release, the plates 28 move to the left because of their engagement with the grooved portion 29 of these bolts, bringing the left-hand faces of these plates into engagement with the overhanging lip at the outer edge of grooves 31 and moving valve plate 4' to the left also, away from the raised face flange 19. This moves the blanking plate or valve plate 4' away from the raised face flange 19 on pipe section 1, so that the main gasket 20 will clear the raised face flange 19 by the necessary 1/8 inch. This ensures protection for the main gasket 20 as valve plate 4' is thereafter moved upwardly by pulling upwardly on stem 5. The slide plates 28 also prevent the blanking plate 4' from binding, as it moves upwardly, since these slides guide the movement of the blanking plate, by means of grooves 31 in such plate.

The blanking valve of this invention provides great savings in time, labor, and expense. Time is saved because the lines can be blanked (thus blanking the plant) before depressuring. This ensures that there will be no leakage back into the plant while depressuring is taking place. Labor is saved because no flanges need to be broken open to effect the blanking, and the plant operating personnel can blank off the plant themselves, without calling in special maintenance personnel. Expense is reduced since the blanking valve of this invention, because of its simple mode of operation, can be easily operated from a portable ladder, without the necessity of building a scaffold.

By mere visual examination, referring to the position of disc 18, it may be easily determined whether the valve is closed or open.

After a shutdown, if one of the blanking valves of the invention is inadvertently left "closed," the line does not need to be depressured before this "blank" can be removed; this can be done with the "pressure-blanker" while the line is under pressure.

At the bottom of the pipe 1, and communicating with this pipe, there are provided two valves 26, one on either side of the housing 3, i.e., one on either side of the plate 4' (FIG. 1), these valves being say of one-inch size. These valves can be opened for sampling the pressure on the two sides of plate 4', or they can be used for purging, venting, steaming, or washing of the line.

It is within the scope of this invention to use the blanking valve as a replacement for conventional gate valves, in certain instances. By way of example, suction valves on feed tanks are always either in a wide open position or else completely closed; when the valves are closed, they are generally intended to provide complete shut-off (or "blanking"). Therefore, the blanking valve of this invention would be eminently suitable for such use.

An annular gasket 33 is secured in the upper portion of housing 3, on the right-hand interior face thereof. This gasket has a diameter greater than that of main gasket 20, and is adapted to seal against the right-hand face of blanking plate 4' when the latter is in the raised or "open" position illustrated in FIG. 2. If desired, an annular groove or recess (not shown), of the same diameter as gasket 33, can be provided in the right-hand face of blanking plate 4'.

When the valve plate 4' has been raised to the "open" position illustrated in FIG. 2, the two upper bolts 21' on each side can engage the corresponding depressions 32 and force plate 4' to move horizontally to the right, to bring the right-hand face of plate 4' into sealing engagement with the fixed gasket 33. This provides a sealed chamber 34 within which is located the main gasket 20. In other words, the main gasket 20 is then sealed off from the liquid in the pipe 1; if this main gasket is not constantly exposed to liquid in the pipe, its life is prolonged.

The gasket 33 has a thickness such that when the blanking plate 4' is brought into sealing engagement with it, there is sufficient horizontal clearance between the wall of housing 3 and main gasket 20 to leave the latter entirely relaxed or unstressed, at the same time that it is sealed off from the liquid in pipe section 1.

In order to determine if a perfect seal between blanking or valve plate 4' and gasket 33 has been made, and also in order to devoid the sealed chamber 34 of any liquid, a bleeder valve 35 is provided. This valve is located on the gasket side of housing 3, near the lower end of the upper portion of this housing, and it communicates with the interior of the housing, i.e., with sealed chamber 34.

The blanking valve of this invention, by reason of its simple and convenient operation, is also very useful in emergencies. Ordinary, i.e. conventional, gate valves may become corroded and hard to operate, thus reducing their effectiveness for emergency use. On the other hand, the blanking valve of this invention may be closed very rapidly in case of emergency; all that is necessary is to loosen the upper two of the bolts 21' on each side a couple of turns, then rapidly push the plate 4' down, and then tighten the lower two of the bolts 21' on each side a couple of turns. This valve may be closed while the line is under pressure, in the event of emergencies as described.

The invention claimed is:

1. A blanking valve comprising a pipe, a housing on said pipe and communicating with the interior thereof, an imperforate plate slidably mounted in said housing, a manually-operable stem secured to said plate and sealed through the wall of the housing, thereby to provide for manual actuation of said plate to move the same out of said housing into said pipe, at least one pair of bolts aligned with each other in the direction of movement of said plate, said bolts being threaded through the wall of said housing and extending substantially parallel to the axis of said pipe; and a guide member mounted on and secured to said bolts in such a manner that the bolts can rotate freely with respect to said member but the bolts cannot move longitudinally with respect to said member; said plate having in one face thereof an elongated groove extending in the direction of movement of said plate and receiving therein said guide member, whereby said guide member guides the movement of said plate out of said housing into said pipe and vice versa; said groove having an overhanging lip along its outer edge which comes into engagement with said member when said bolts move longitudinally parallel to the axis of said pipe in one direction, thereby to cause movement of said plate in this same direction; and the inner ends of said bolts coming into engagement with said plate when the same has moved out of said housing and into said pipe and when said bolts move longitudinally parallel to the axis of the pipe in a direction opposite to said one direction, thereby to move such plate into sealing engagement with the wall of said pipe.

2. A blanking valve comprising a pipe, a housing on said pipe and communicating with the interior thereof, an imperforate plate slidably mounted in said housing, a manually-operable stem secured to said plate and sealed through the wall of the housing, thereby to provide for manual actuation of said plate to move the same out of said housing into said pipe, a plurality of bolts threaded through the wall of said housing and extending substantially parallel to the axis of said pipe, the inner ends of said bolts being adapted to come into engagement with said plate, when the same has moved out of said housing and into said pipe, to move such plate into sealing engagement with the wall of said pipe; a first annular gasket positioned between said plate and the wall of said pipe, to effectuate said sealing engagement; a second annular gasket sealed to the inner wall of said housing beyond the wall of said pipe and on a side of said housing opposite to said bolts, the diameter of said second gasket being greater than that of said first gasket; and a bolt threaded through the wall of said housing and adapted to come into engagement with said plate, when the same is within said housing, to move such plate into sealing engagement with said second gasket, thereby to seal off said first gasket from said pipe.

References Cited in the file of this patent

UNITED STATES PATENTS

| | | |
|---|---|---|
| 1,000,173 | Hughes | Aug. 8, 1911 |
| 1,185,789 | Garbe | June 6, 1916 |
| 1,946,319 | Hodgson | Feb. 6, 1934 |
| 2,786,644 | Koppl | Mar. 26, 1957 |
| 3,033,516 | Williams | May 8, 1962 |

FOREIGN PATENTS

| | | |
|---|---|---|
| 33,825 | Germany | Nov. 27, 1885 |